Patented May 30, 1933

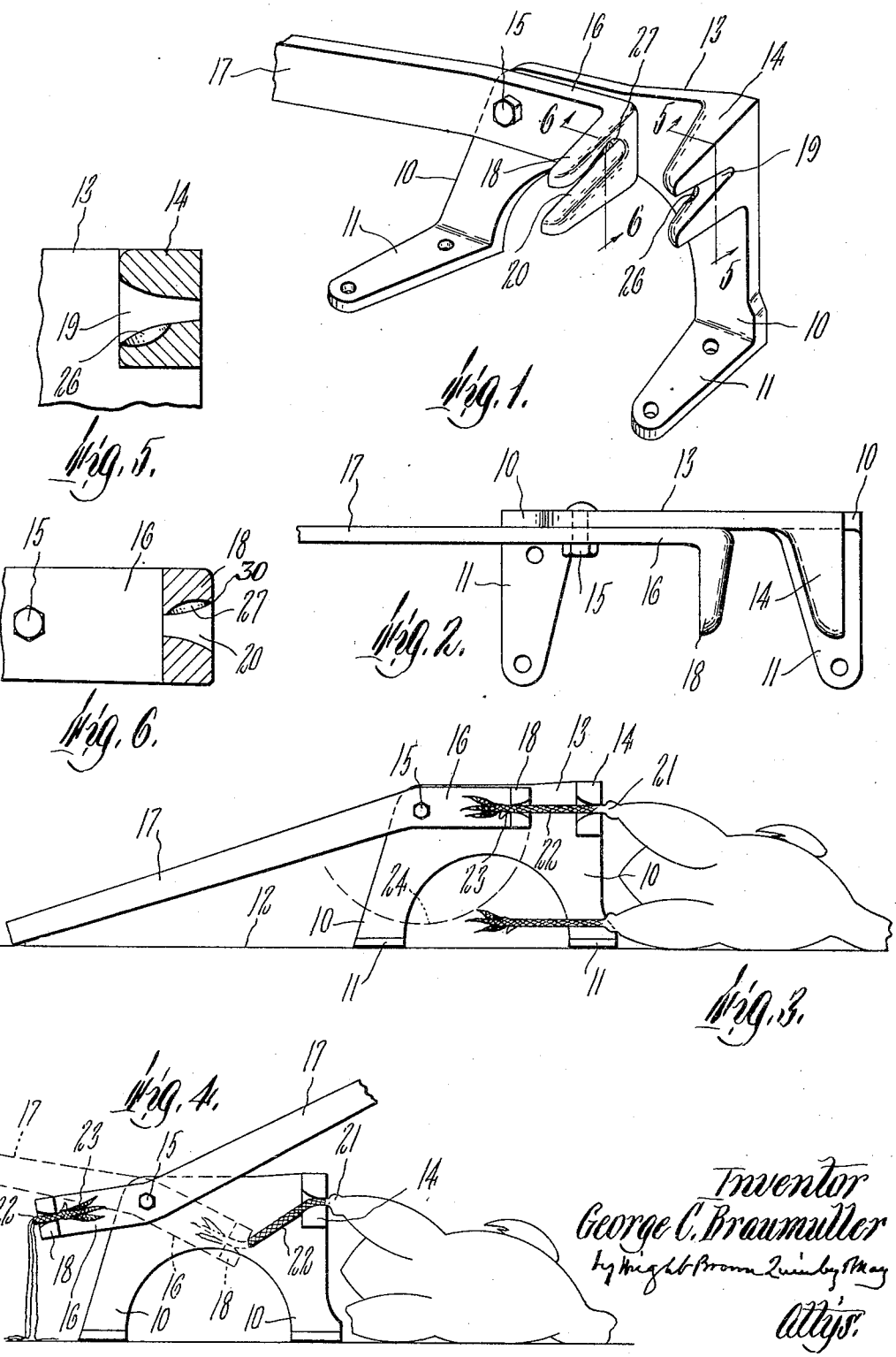

1,912,124

UNITED STATES PATENT OFFICE

GEORGE C. BRAUMULLER, OF NEWARK, NEW JERSEY

SINEW EXTRACTOR

Application filed April 21, 1932. Serial No. 606,618.

This invention relates to means for extracting sinews from the edible portions of legs of turkeys and other fowls. The sinews adhere tenaciously to a leg foot and are withdrawable with the foot from the edible portions of the leg when the bone of the first joint is broken, the foot, a portion of said bone, and the sinews being thus rendered separable from the edible portions of the leg.

The chief object of the invention is to provide an extractor of simple, strong and durable construction adapted to be rapidly operated by a single unidirectional swinging movement of a lever on its fulcrum to first break the bone of the first joint, and then separate the foot, the broken off portion of the bone, and the sinews from the edible portion of the leg, the breakage of the bone being automatically effected by an initial part of the swinging movement of the lever.

Of the accompanying drawing forming a part of this specification,—

Figure 1 is a perspective view of a sinew extractor embodying the invention.

Figure 2 is an edge view of the same.

Figure 3 is a side elevation showing the extractor and a fowl, the extractor lever being shown in its initial or leg-receiving position.

Figure 4 is a view similar to Figure 3 showing the lever by dotted lines moved to its bone-breaking position, and by full lines at the end of its sinew extracting movement.

Figure 5 is a section on line 5—5 of Figure 1.

Figure 6 is a section on line 6—6 of Figure 1.

The same reference characters indicate the same parts in all of the figures.

My improved extractor is composed of a holder provided with means for attachment to a support 12, and a two-armed lever of the first class fulcrumed on the holder.

In the preferred embodiment here shown the holder is a one-piece casting which includes an elongated plate or standard 13 and legs 10 having feet 11 adapted to be screwed to the support 12, and maintain the standard 13 in a position outstanding from the support.

The standard is formed to project outwardly from the support and its projecting outer portion is suitably spaced from the support to permit the leg-breaking and sinew-extracting operations hereinafter described.

Fixed to one end of the projecting outer portion of the standard, and preferably cast integral therewith, is a forked leg-gripping jaw 14 projecting laterally from one side of the standard.

One side of the jaw 14 constitutes an abutment for the portion 21 of a fowl's leg, as shown by Figure 3.

The lever is also preferably a one-piece casting and is pivotally connected by a fulcrum member 15 with the opposite end of the projecting outer end portion of the standard 13, the lever including a shorter arm 16 and a longer arm 17.

Fixed to, and preferably integral with the shorter arm 16, is a forked leg-gripping jaw 18 projecting laterally from the lever and extending substantially parallel with the holder jaw 14.

The jaws 14 and 18 are provided with V-shaped leg-gripping notches formed and arranged to receive spaced apart portions of a leg, said notches being designated respectively by 19 and 20. The notch 19 receives a part of the leg adjacent the portion 21 which abuts the fixed jaw 14, and the notch 20 receives a portion of the first joint 22, carrying the foot 23, said foot projecting from one side of the lever jaw 18.

One of the forks of the lever jaw 18 is provided with a leg-breaking ridge 30 (Figure 6), which is formed and arranged to bear on one side of the leg portion 22 between the jaws, said ridge encountering the leg when the lever is moving from the position shown by Figure 3 to that shown by dotted lines in Figure 4, and breaking the leg when the lever is in, or near, the last mentioned position.

The holder and its jaw 14 are formed and arranged as shown by the drawing, to permit an ample swinging movement of the lever on its fulcrum, the amplitude of said movement being such that the lever is adapted to be moved first to the position shown by Figures 1 and 3, and locate its jaw 18 in a leg-receiving position between, and substantially in alinement with the holder jaw 14 and fulcrum 15, then to the leg-breaking position shown by dotted lines in Figure 4, and finally to the position shown by full lines in Figure 4.

The described movement causes the lever jaw 18 to move in an arcuate path 24, (Figure 3), which is so directed that the lever jaw moves first inward from its initial position between the holder jaw 14 and fulcrum 15, and breaks the bone of the first joint 22, and then outward from the holder jaw, and pulls the foot 23 away from the holder jaw and the portion left in engagement therewith, so that the sinews adhering to the foot are extracted from the edible leg portions left in engagement with the holder jaw. It will be seen that the lever is adapted to stand in a starting position shown by Figure 3, causing the shorter lever arm to project in one direction from the fulcrum member 15, and locate the lever jaw 18 at a minimum distance from, and beside the fixed jaw 14, and that the lever is adapted also to swing from said starting position to a final position (Figure 4), causing the shorter arm to project in the opposite direction from the fulcrum member, and locate the lever jaw at a maximum distance from the fixed jaw. When the lever is in Figure 4 position its jaw 18 is spaced from the fixed jaw 14 by more than twice the length of the shorter lever arm 16, so that the movement of the lever jaw to its final position is of sufficient amplitude to cause the complete extraction of the sinews from the fleshy leg portion remaining in engagement with the fixed jaw 14.

It will now be seen that the leg is broken and the sinews are extracted by a single unidirectional swinging movement of the lever on its fulcrum, so that the time required for the operation is reduced to a minimum. The breakage of the leg caused by the ridge 30 is automatic in that it does not involve a separate operation.

The longer arm 17 of the lever is preferably inclined relative to the shorter arm 16, and formed and arranged to bear loosely on the extractor support 12 when the lever jaw 18 is in the leg-receiving position shown by Figure 3, and thereby maintain the jaw in said position while a leg is being engaged therewith, both hands of the operator being free to force leg portions into the jaws 14 and 18.

The V-shaped notches of the jaws 14 and 18 decrease in width from the outer ends inwardly, so that leg portions forced into the notches are gripped by the sides thereof. I prefer to provide a side of each notch with a cupped recess into which a gripped leg portion may bulge to oppose displacement of said portion toward the mouth of the notch. The recess of the holder jaw notch is designated by 26 in Figures 1 and 5, and the recess of the lever jaw notch by 27 in Figures 1 and 6.

The support 12 may be horizontal and provided by a bench, or vertical and provided by a suitable upright, such as a wall or post.

The portion of the standard 13 on which the fixed jaw 14 is formed, and with which the fulcrum member 15 is engaged, is oblong, and constitutes an outer standard portion. The opposite portion of the standard constitutes a base portion and includes attaching means, such as the feet 11, for attaching the standard to a support 12, the standard outstanding so that the outer portion, the fixed jaw 14 and the fulcrum member 15 are spaced outwardly from the base portion, and from the support.

The jaw 14 is fixed to one end of said outer portion, and the fulcrum member 15 is engaged with the opposite end of said portion. Said jaw and fulcrum member are spaced from the base portion and support a distance greater than the length of the shorter arm 16, so that the lever is movable unidirectionally from the starting position, Figures 1, 2 and 3, causing the leg end portion 22 to extend in a straight line from the jaw 14 to the jaw 18, to the final position, Figure 4, the lever jaw 18 moving in an arcuate path, first toward the base portion to break the leg end portion 22 near the foot thereof, and then away from the fixed jaw 14 to pull the broken-off foot portion away from the fixed jaw and extract from the fleshy portion 21 the sinews adhering to the foot portion.

I claim:

1. A sinew extractor comprising a standard having a base portion including attaching means engageable with a support, and an oblong outer portion spaced outwardly from the attaching means, said outer portion being provided at one end with a laterally projecting fixed forked jaw formed to bear on the opposite sides of an end portion of a leg and constitute an abutment for a fleshy portion thereof, and at the opposite end with a fulcrum member, a two-armed lever oscillatable on said member, and having a shorter arm provided with a laterally projecting forked jaw formed to bear on opposite sides of said leg end portion, said fixed jaw and fulcrum member being spaced from each other and from the attaching means a distance greater than the length of the shorter lever arm, said lever jaw being provided with means for flexing and breaking the leg end portion near the foot portion thereof, and movable first to a starting position beside the fixed jaw, causing the leg end portion engaged with the jaws to extend in a straight line from one jaw to the other, then from said position in an arcuate path, to first flex and break away the foot end of said leg portion, and finally move said foot end away from the fixed jaw and thereby extract from the fleshy leg portion the sinews adhering to the foot portion.

2. A sinew extractor as specified by claim 1, said lever having the longer arm inclined relative to the shorter arm, and arranged to rest on a support engaged by said attaching means and thereby maintain the lever in its starting position while a leg is being engaged with the two jaws.

In testimony whereof I have affixed my signature.

GEORGE C. BRAUMULLER.